April 17, 1928.

L. ROUANET 1,666,352

SPLIT PULLEY

Original Filed March 5, 1926    2 Sheets-Sheet 1

L. Rouanet
INVENTOR
By: Marks & Clerk
Attys.

April 17, 1928.

L. ROUANET 1,666,352

SPLIT PULLEY

Original Filed March 5, 1926   2 Sheets-Sheet 2

L. Rouanet
INVENTOR

By: Marks & Clerk
Attys.

Patented Apr. 17, 1928.

1,666,352

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

SPLIT PULLEY.

Original application filed March 5, 1926, Serial No. 92,567, and in France April 11, 1925. Divided and this application filed May 12, 1927. Serial No. 190,889.

The present invention concerns split pulleys clamped onto the shaft by means of the hub, and the outer band of which is closed on the two halves of the pulley, at one end of the dividing diameter, by means of members which are balanced by counterweights located at the other end of the said diameter.

This application is a divisional of my copending application 92,567, filed March 5, 1926.

According to the invention, the pulley is characterized by the fact that cuts or hollows are formed partially in each of the two adjacent faces of the halves of the pulley near the end of the dividing diameter which is opposite that at which the locking members are located, in order to enable removable counterweights to be clamped in the said hollows by simply tightening the bolts used for securing the pulley onto the shaft.

In the accompanying drawing, illustrating a practical embodiment of the invention:

Figure 1:
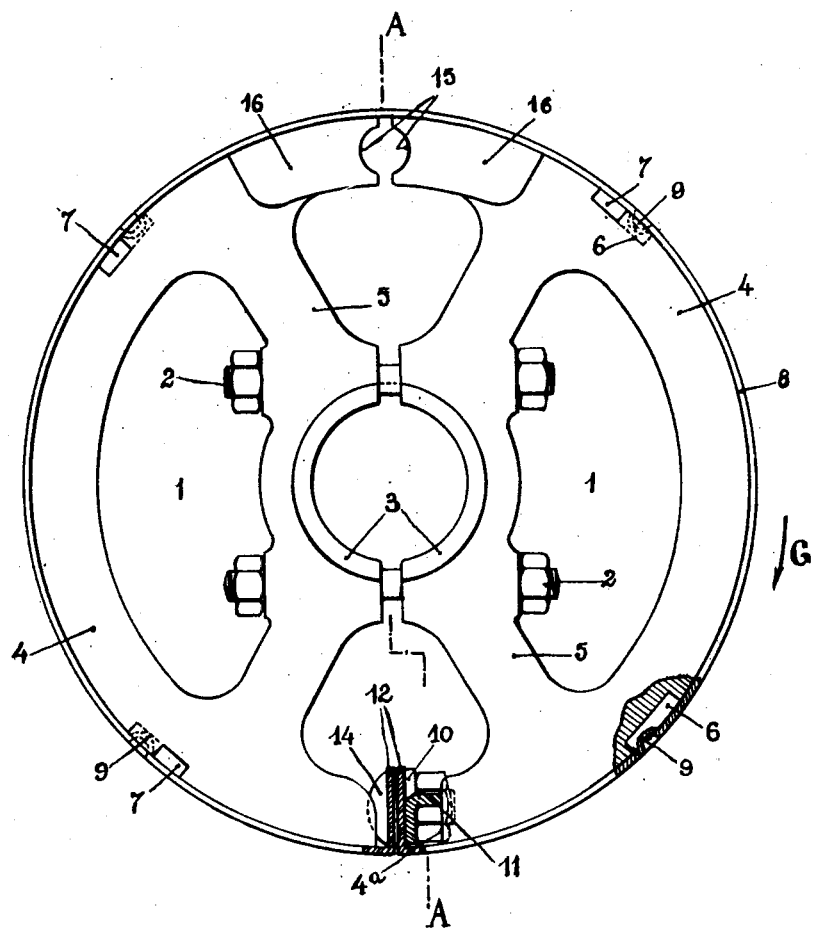
Fig. 1 is a side elevation, with parts broken away, of a pulley constructed in accordance with the invention.
Figure 3:
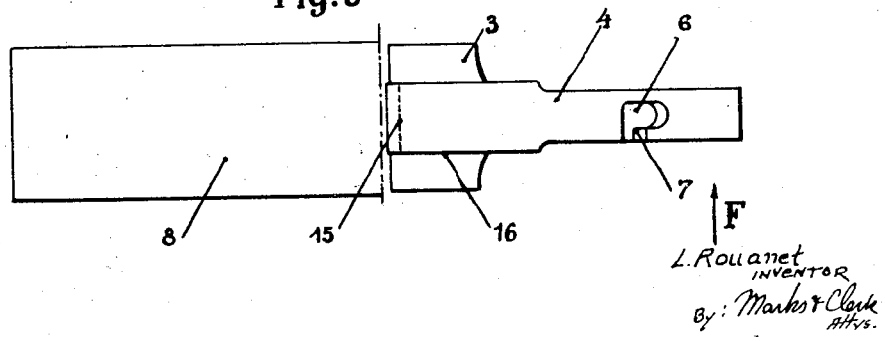
Fig. 3 is a plan view, the outer band not being represented on the right hand half of the figure.
Figure 2:
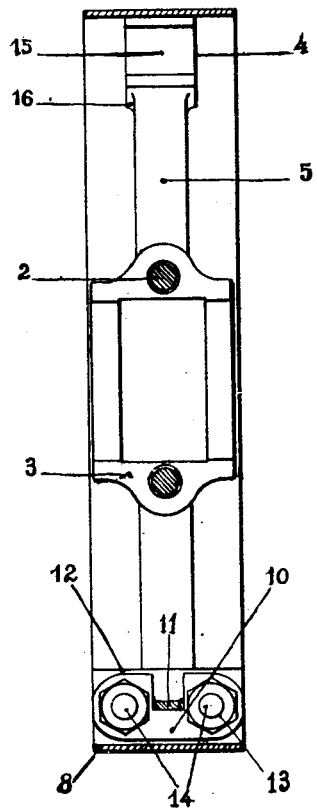
Fig. 2 is a sectional view taken along the broken line A—A of Fig. 1.
Figure 4:
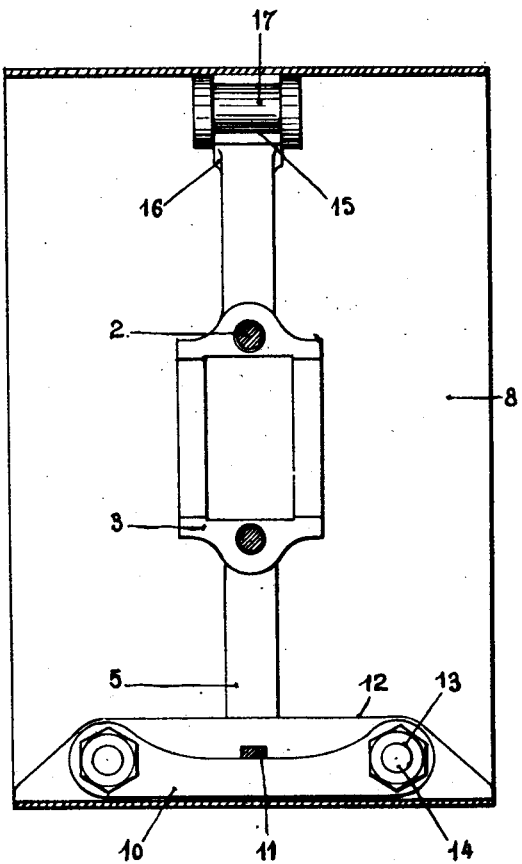
Fig. 4 is a view similar to that of Fig. 2, but showing a pulley with a wider outer band.

In Figs. 1 to 4 inclusive, the pulley body is divided into two approximately symmetrical parts 1, the said body being fixed onto the shaft (not shown) by means of bolts 2 extending through the hub part 3 which is connected to the rim 4 by means of the spokes 5.

The band 8 surrounds the rim 4 and is connected at its ends by a locking device composed of a member 10 having a tongue or projection 11 perpendicular to the said part 10, the latter being inserted between one of the bended ends 12 of the band 8 and the adjacent end of the rim when the said band is mounted in operative position on the pulley body.

The locking member 10 has two openings 13 through which are passed the bolt 14 used for tightening the outer band onto the pulley body.

When the member 10 is in proper position between one of the bended ends 12 of the outer band and the adjacent end 4ª of the pulley rim, the openings 13 in the said member 10 coincide with the holes bored in the bended ends 12 of the band, to insert the bolts 14 which are used to clamp the said band 8 onto the pulley body.

According to the invention, the pulley is balanced as follows:

Each half 1 of the pulley body has a hollow 15 and an extra thickness of material 16 (integral with or secured to) formed at the point diametrically opposite the connection between the ends of the band, the said hollow and extra thickness of material being designed so as to balance the weights of the bended ends 12 of the band, of the locking member 10, of the bolts 14 used to secure the band onto the pulley body, and eventually of any other unsymmetrical parts.

In the cases of pulleys with wider outer bands, the balance is obtained with the same pulley body, by adding weights 17, made of more or less ductile material such as lead, specially designed for each size of outer band and located between the hollows 15 when tightening the bolts 2 by means of which the pulley body 1—1 is secured onto the shaft.

I claim:

A split pulley having a two part body, fastening bolts adapted to secure said body to a shaft, a split outer band arranged about the body and closed thereon at one end of the dividing diameter, fastening means for connecting the free ends of the outer band, the adjacent faces of the two parts of the body near the end of the dividing diameter opposite that to which the fastening means are located being provided with recesses, counterweights removably arranged in the said recesses and said weights being held in position upon the tightening of the fastening bolts.

LOUIS ROUANET.